(12) United States Patent
Williames

(10) Patent No.: US 6,651,384 B1
(45) Date of Patent: Nov. 25, 2003

(54) VACUUM FORMED INDEXABLE LIGHTWEIGHT, RECYCLABLE TRAYS

(75) Inventor: Geoffrey Alan Williames, Warragul (AU)

(73) Assignee: Williames Hi-Tech International Pty Ltd., Warragul (AU)

( * ) Notice: Subject to any disclaimer, the term of this patent is extended or adjusted under 35 U.S.C. 154(b) by 0 days.

(21) Appl. No.: 09/617,401

(22) Filed: Jul. 17, 2000

(30) Foreign Application Priority Data

Jul. 20, 1999 (AU) ............................................. PQ1710

(51) Int. Cl.[7] .............................. A01G 9/10; A01G 9/02
(52) U.S. Cl. ............................................. 47/86; 47/66.5
(58) Field of Search ................................. 47/66.5, 66.1, 47/86, 77, 1.01 R; 425/465

(56) References Cited

U.S. PATENT DOCUMENTS

| | | | | |
|---|---|---|---|---|
| 4,887,388 A | * | 12/1989 | Waltel, Jr. ..................... | 47/86 |
| 4,947,579 A | * | 8/1990 | Harrison et al. ......... | 47/1.01 R |
| 4,962,855 A | * | 10/1990 | Holmquist .................. | 47/66.1 |
| 5,022,183 A | * | 6/1991 | Bohlmann ...................... | 47/86 |
| 5,247,761 A | * | 9/1993 | Miles et al. ............. | 47/1.01 R |
| 5,274,953 A | * | 1/1994 | Nicholson | |
| 6,237,286 B1 | * | 5/2001 | Williames ................... | 47/66.5 |
| 6,290,895 B1 | * | 9/2001 | Wang et al. ................ | 264/510 |

FOREIGN PATENT DOCUMENTS

EP 0254434 A2 * 1/1988

* cited by examiner

Primary Examiner—Peter M. Poon
Assistant Examiner—Jeffrey L. Gellner
(74) Attorney, Agent, or Firm—John K. McCulloch

(57) ABSTRACT

An indexable vacuum formed nursery tray and a method of making same, the tray being formed from a sheet of plastic material and including a plurality of rows of vacuum formed cells positioned between at least two spaced rows of indexing apertures formed in the sheet and wherein the thickness of the plastic sheet at least the zones containing the indexing apertures being no less then the minimum thickness of the street of plastic material prior to forming and preferably of a thickness greater than said minimum thickness.

42 Claims, 15 Drawing Sheets

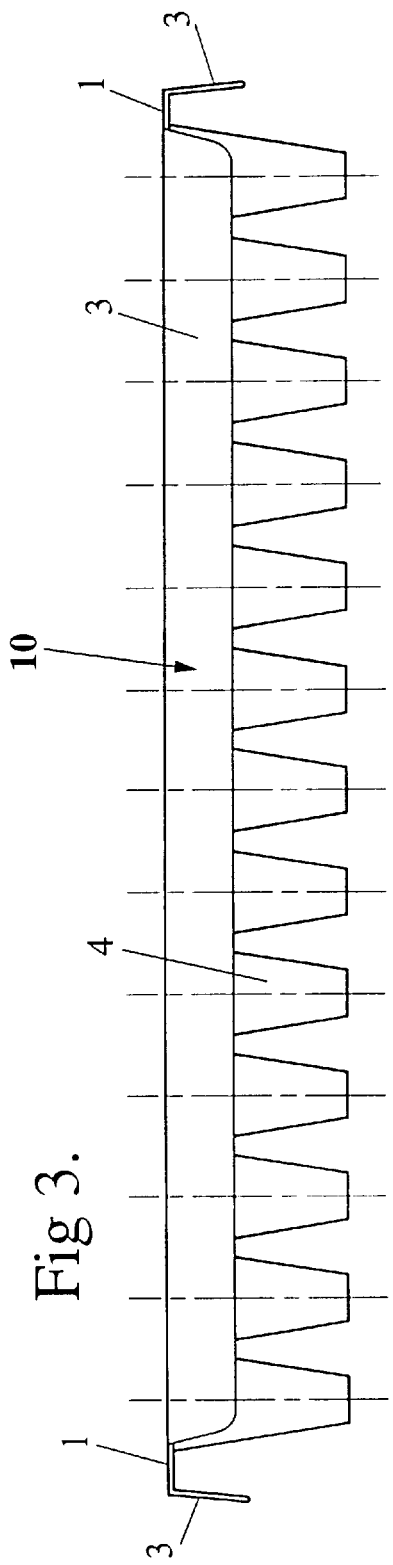
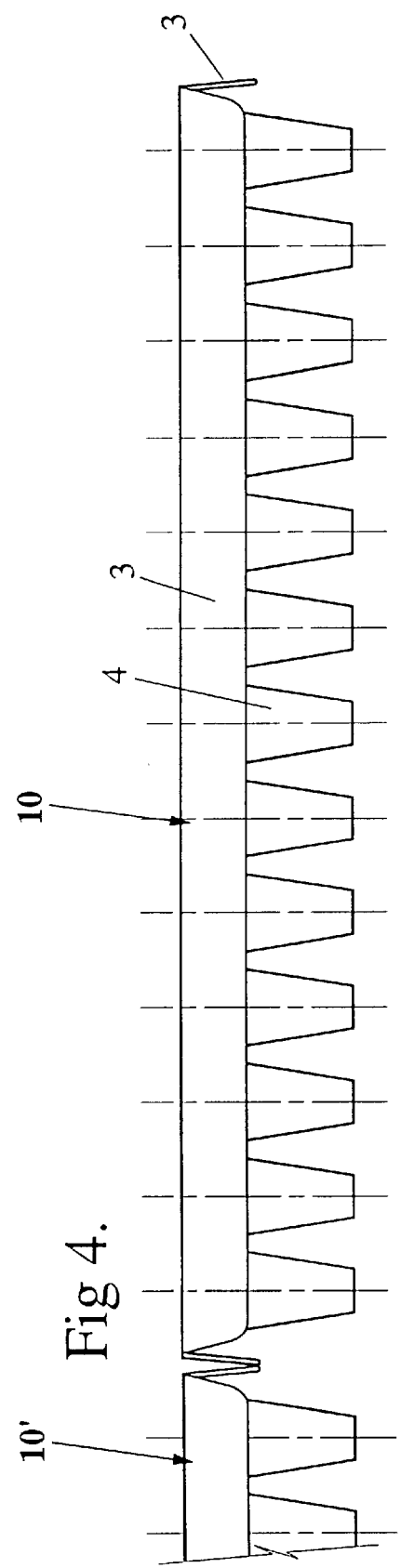

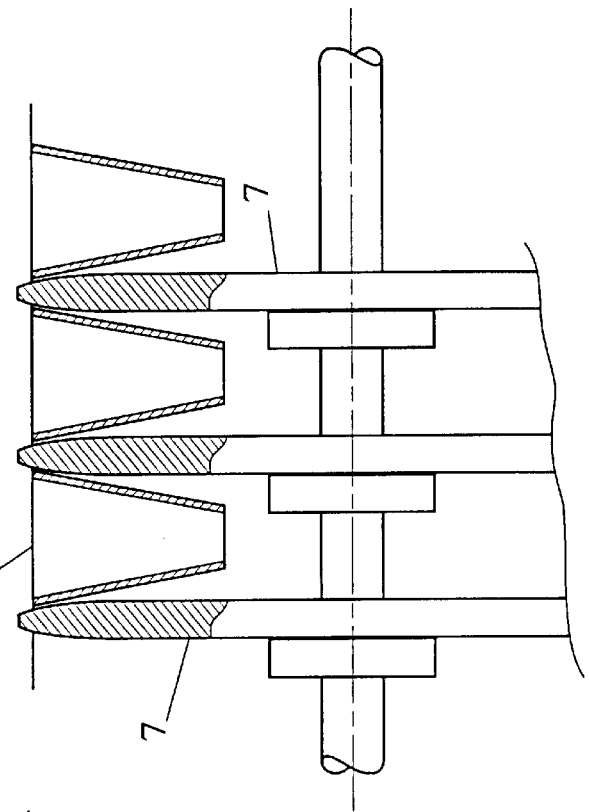
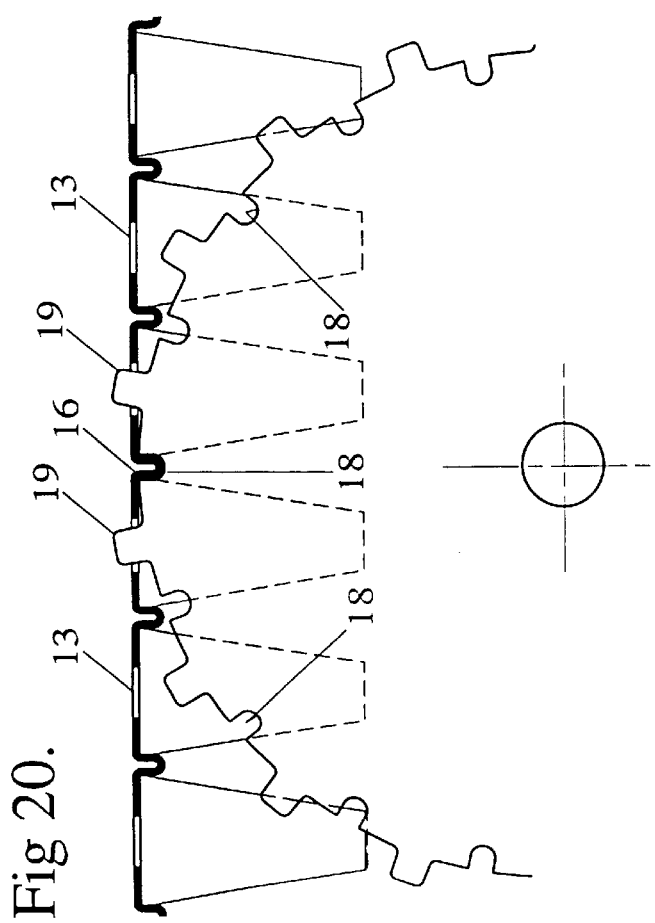

VACUUM FORMED INDEXABLE LIGHTWEIGHT, RECYCLABLE TRAYS

BACKGROUND OF THE INVENTION

1. Field of the Invention

The present invention relates to improved forms of moulded polymeric plastic material nursery trays and also to methods of manufacturing same.

2. Description of the Relevant Art

Traditionally nursery trays have been made from three types of construction. The first is from polystyrene foam, which due to the soft nature of the material has had very limited use in automatic transplanting machines. A second type of construction has utilised vacuum forming techniques whereby a pre-heated single sheet of plastic is formed with vacuum into a tray.

The nature of the previous methods of manufacture and shapes achievable from the pre-heated flat sheet were generally configured in a series of cells and interconnected by a flat upper surface which is sometimes formed downwardly around the outer perimeter for a short distance and then blanked out with a steel rule die to form an outwardly protruding thin flange. Generally, these are not very accurate for location or distance because of the flimsy nature of the vacuum formed tray and existing designs to date have not been suitable for automatic transplanting.

Injection die moulded hard plastic trays form a third form of construction and have been able to be manufactured in complex shapes and sizes and by the nature of being moulded by fluid plastic injected into chilled dies. Material section thickness and shapes are readily obtainable to enable the trays to be used in automatic transplanting machines, but by the nature of the complexity and cost of dies and the high capital costs of the moulding machines the relatively slow cycle time causing the costs to be such that the tray must be of a structure and design giving very long life and repeated usage which requires arduous cleaning and sterilising processes between nursery usages.

SUMMARY OF THE INVENTION

It is an object of this invention to enable the usage of a very lightweight, low cost vacuum formed tray to be used in automatic transplanting machinery, thereby providing precision plant placement with low labour cost. The invention preferably allows for a tray to be used effectively but because of its low cost, the tray may be used only once saving return freight from point of supply, maintaining absolute hygiene at the nursery and preventing any introduction of disease by way of returning trays and very importantly the invention provides for the ecologically friendly ability of the used tray to be recycled.

It is a further preferred objective to provide a nursery tray capable of use with automatic transplanting machinery of the type disclosed in Australian Patent Application No. 53040/98 or U.S. patent application Ser. No. 331,906, which specification is incorporated herein by this reference thereto.

The present invention provides an indexable vacuum formed nursery tray made from a sheet of polymeric plastic material having at least two aligned rows of indexing apertures formed in said sheet and a plurality of vacuum formed cells located between said rows of indexing apertures adapted to be filled with growing medium for plant propagation. Preferably, the sheet of plastic material is preformed with zones of thicker plastic material with said indexing apertures being formed in a said zone of thicker plastic material prior to vacuum forming of said cells. Preferably the sheet of plastic material is formed via an extrusion process which also includes providing at least some of said zones of thicker plastic material during the extrusion process.

Conveniently, the present invention also provides a nursery tray as aforesaid further including transverse stiffening ribs of relatively thicker plastic material between at least some adjacent rows of said cells, said stiffening ribs being disposed generally laterally relative to the rows of indexing apertures.

In accordance with one preferred nursery tray arrangement, a first said row of indexing apertures is provided on a first laterally extending flange portion on one peripheral side of the cells and a second said row of indexing apertures is provided on a second laterally extending flange portion on the other peripheral side of the cells, the nursery tray arrangement further having a depending stiffening flange portion extending downwardly from an outer edge of each of said first and second flanges towards a base region of the nursery tray arrangement. Preferably, the nursery tray arrangement further includes external or peripheral stiffening flange portions extending perpendicular to the stiffening flange portions located outwardly of the indexing apertures, the further stiffening flange portions being located at a peripheral edge of the outermost cells.

In accordance with another preferred nursery tray arrangement, a first said row of indexing apertures is provided in a bridging plastic material zone between adjacent said cells, and a second row of indexing apertures is provided spaced from said first row also located in a bridging plastic material zone between adjacent said cells. Multiple aligned said rows of indexing apertures may also be provide between the bridging plastic material zones between adjacent said cells, the number of said rows of indexing apertures being any number more than two up to and including all of the bridging plastic material zones between adjacent cells. The indexing apertures are conveniently preformed prior to vacuum forming the cells. The shape and positioning of the indexing apertures may be such as to cooperate with similarly formed indexing wheel teeth on an indexing mechanism. The apertures may be square, rectangular, circular or any other convenient shape.

In one particularly preferred nursery tray arrangement, a transversely formed trough is formed in at least one bridging plastic material region between adjacent rows of said cells, said trough or troughs extending substantially across said nursery tray laterally relative to said aligned rows of indexing apertures. Conveniently the trough or troughs are formed at the same time as the said cells, conveniently also by vacuum forming techniques.

The present invention also provides a method of forming a nursery tray having an array of propagating cells with at least two aligned rows of indexing apertures in spaced defined zones, said method involving the steps of:

(i) providing a sheet of plastic material capable of being formed;

(ii) forming said indexing apertures in said defined zones of said sheet;

(iii) restraining at least said defined zones to maintain a predetermined thickness of material in said defined zones; and (iv) heating at least the remainder of said sheet and forming same to form said propagating cells without substantially reducing the thickness of said defined zones.

Preferably the sheet of plastic material may include thickened regions in a predefined pattern relative to the remainder of said sheet of plastic material, said predefined pattern at least including said spaced defined zones. Advantageously, the predefined pattern also includes regions intended to form stiffening ribs or formations in the tray.

In accordance with a still further aspect, the present invention provides an indexing and plant eject arrangement for use with nursery trays of the type including a plurality of cells arranged in predefined adjacent rows and at least two spaced aligned rows of indexing apertures generally perpendicular to said rows of cells, said arrangement including a guide means for guiding said trays along a substantially vertical path downwardly past an eject mechanism, said guide means including edge restraining means to restrain lateral edge regions of the trays during said downward movement, and a carrier mechanism moveable between a first position adopted to receive a plurality of seedlings or plants ejected from a said nursery tray and at least one second position adapted-to discharge one or more seedlings from the carrier mechanism, said carrier mechanism in said first position being adapted to engage said tray to at least restrain movement of said tray forwardly or transversely of said path during transfer by said eject mechanism of seedlings or plants from said tray to said carrier mechanism.

Conveniently, at least two spaced indexing wheels are provided having indexing teeth adapted to engage said indexing apertures from an underneath side of said trays.

Preferably the arrangement may include one or more upright guide members adapted to be received between adjacent cells as the tray is indexed in a downward direction, the guide member or members engaging an underneath side of the tray. Preferably, a cross guide support means is also provided to restrain forward movement of the tray or portions of the tray during indexing and/or ejection stages.

Preferred aspects of this invention allow for the use of extruded plastic sheet material either in a parallel flat form or with strategic ribbons of thicker section linearly along the extruded sheet. The thicker area of extrusion to be appropriately positioned to add stiffness and strength to the area in contact with the tray indexing mechanism.

In one preferred aspect, the invention provides for the unique forming of the shape of the upper surface of the tray that is interconnected to the cells positioned to be filled with growing medium for plant propagation. The unique features of the upper surface and sides of the tray which include preformed engaging teeth and/or sprocket gear engaging apertures to very accurately contain and control the stepped/indexed decent of the lightweight thin sectioned tray at very high speeds.

Similarly, in a still further preferred aspect, the present invention provides for the interaction of mechanical means to prevent deflection, distortion and misplacement during both the indexing phase and the ejection of plants and plugs. The invention also provides for provision to enable the lightweight vacuum formed tray to withstand the inertial shock loads caused by the sudden indexing for each row of cells to the next imposed on the trays when loaded with wet growing medium and live growing plants.

The claims as annexed hereto define the invention and further form part of the disclosure of the present specification.

BRIEF DESCRIPTION OF THE DRAWINGS

There are shown in the drawings embodiments which are presently preferred it being understood, however, that the invention is not limited to the precise arrangements illustrated in the drawings, wherein:

FIGS. 3 and 4 are side edge views of trays formed as shown in FIG. 2b;

FIGS. 20 and 21 are partial section views showing the tray of FIG. 17 engaged with an indexing mechanism;

DETAILED DESCRIPTION OF THE PREFERRED EMBODIMENTS

Figure 1:
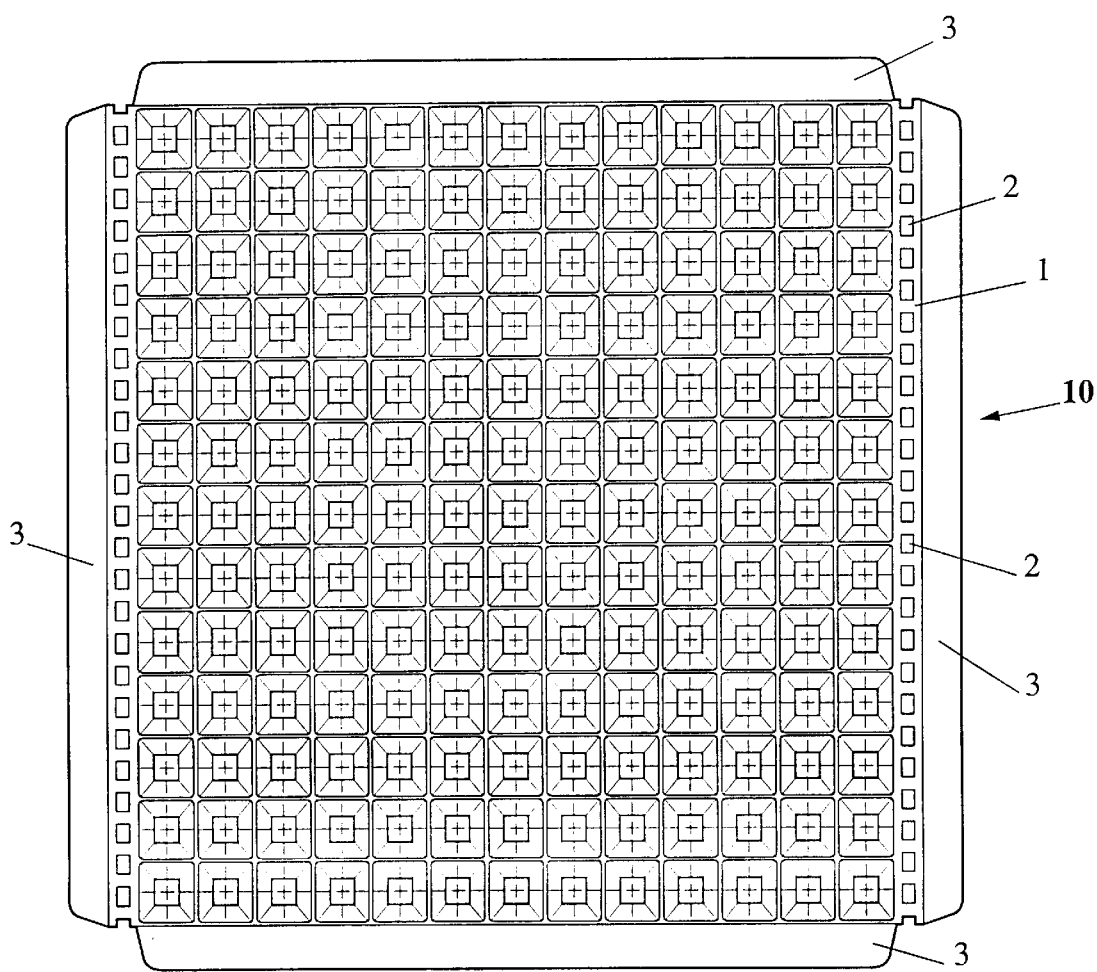
FIG. 1 is an underneath plan view of a first preferred embodiment, partially formed.

FIG. 1 shows a plan view in one preferred embodiment where a plastic sheet can be formed in a tray 10, the sheet being blanked out to form the outer flanges (1) and the indexing notches (2) from the full material thickness of the sheet. This sheet has not been deformed and thinned out by the vacuum forming process and has a clear cut outer edge free for flanges which normally occurs from the traditional vacuum forming process. The pre-heated pre-formed component can then be blown with outside edges being restrained causing the entire sheet which is not restrained to form a bubble which uniformly stretches the area of the tray to be formed into cells each of which has an open top which is co-planar with the flange (1) which contains the indexing notches. This slack pre-heated sheet is then uniformly distributed and pushed into the vacuum forming cell shapes by protruding mechanical rods pushing the plastic sheet from the upper surface down into the cell cavities. Vacuum is then applied to the underside of the sheet to speedily conform the plastic sheet to the required die shape. Importantly the pre-heated outer edges (3) of the sheet flanges 1 are formed downwardly to the correct angle to give stiffness. The outer edges area (1) containing the gear teeth engaging notches (2) being mechanically formed and composed of the original thickness of the plastic sheen which gives great rigidity with this thicker material forming a support edging on all four sides.

Figure 2A:
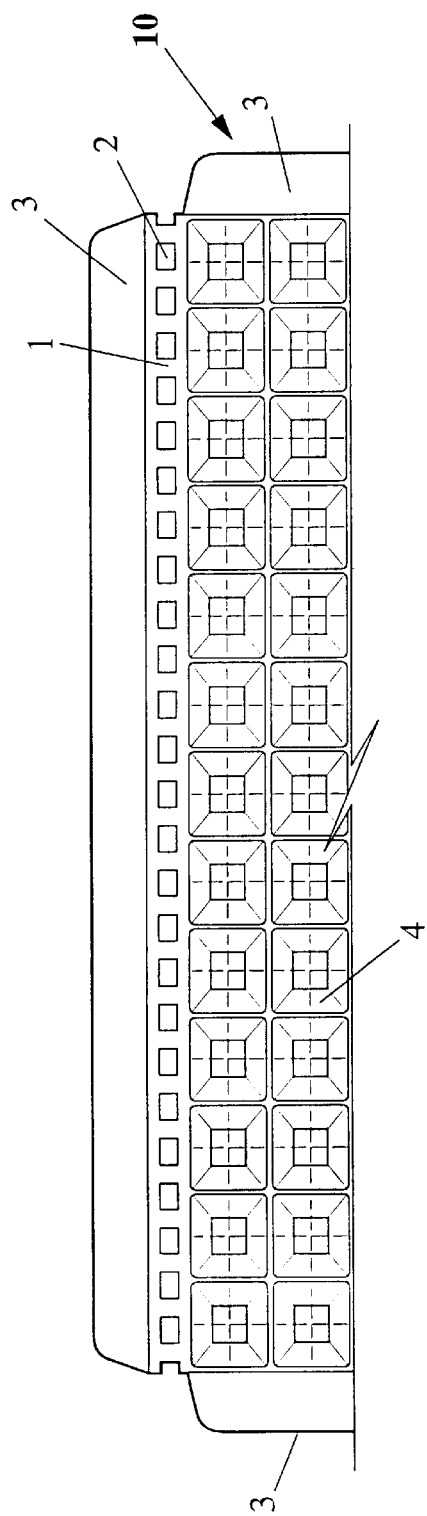
FIG. 2a is a detail view of one edge region of the tray formation shown in FIG. 1.

FIG. 2(a) is an elevation as viewed from the underside of the tray, which shows the location of the indexing notches (2) relevant to the centre line of the cells (4). It also shows the positioning of the end of the trays allowing indexing tray to tray to be maintained at a uniform distance cell to cell across the tray and tray to tray. This is accomplished by each gear engaging in a series of holes at each side of the tray, both on the centre line of the cell and between the cells to provide tray control and containment when indexing from tray to tray.

Figure 2B:
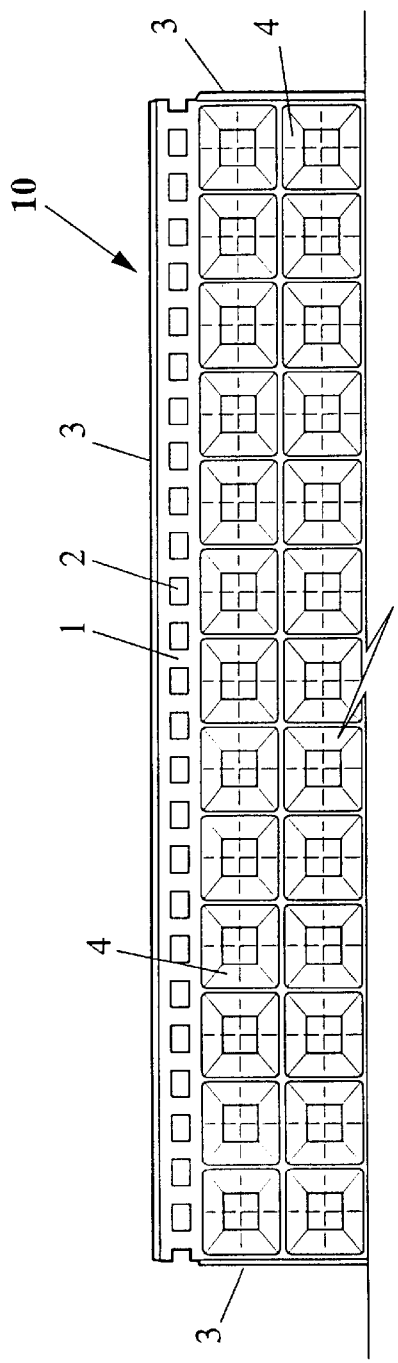
FIG. 2b is a detail view similar to FIG. 2a but showing the external edge flanges in a folded down position.

FIG. 2(b) shows the same tray with the outside flanges (3) folded down to form the main stiffening members.

FIG. 3 shows the flanges (1) and (3) that provide for the support of the tray. This design allows for the indexing gears to enter from the rear of the tray, therefore providing good mechanical engagement and control without contact or damage occurring to plant foliage on the upper side of the tray (see FIG. 6).

FIG. 4 shows an end elevation of the support edges (3) of the tray (10) when vertically resting against the next tray (10') during the indexing cycle, which enables uniformity of, cell placement tray to tray.

Figure 5:
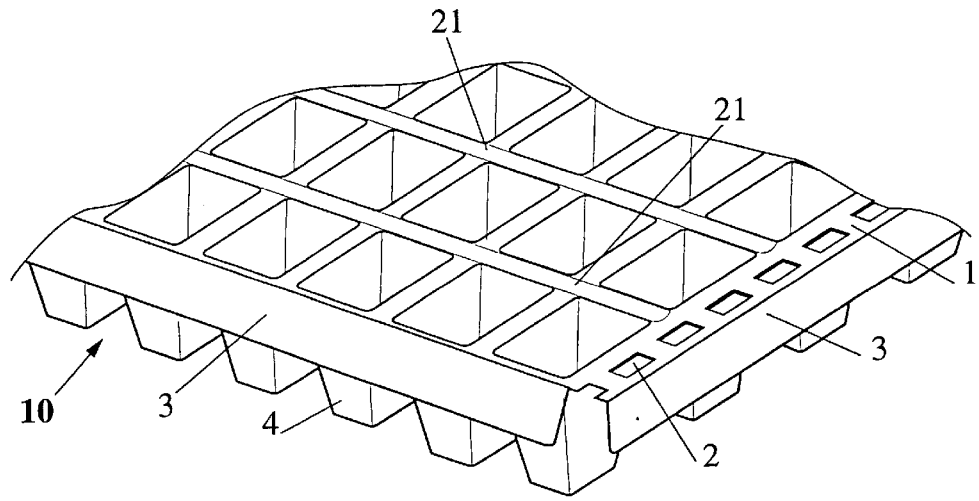
FIG. 5 is a corner perspective view of the tray shown in FIGS. 1 to 4 but including a further preferred feature.

FIG. 5 shows in one preferred embodiment the tray as described in FIGS. 1 to 4 which further includes an inverted rib (21) in a series of locations across the tray to add depth and therefore stiffness.

In one preferred embodiment (FIG. 1) the two side areas of the tray including the flange area (1) which contains the gear engaging notches (2) can have additional thickness effected by the linear extrusion of the sheet with that area being a thicker thickness than of the rest of the tray.

Figure 6:
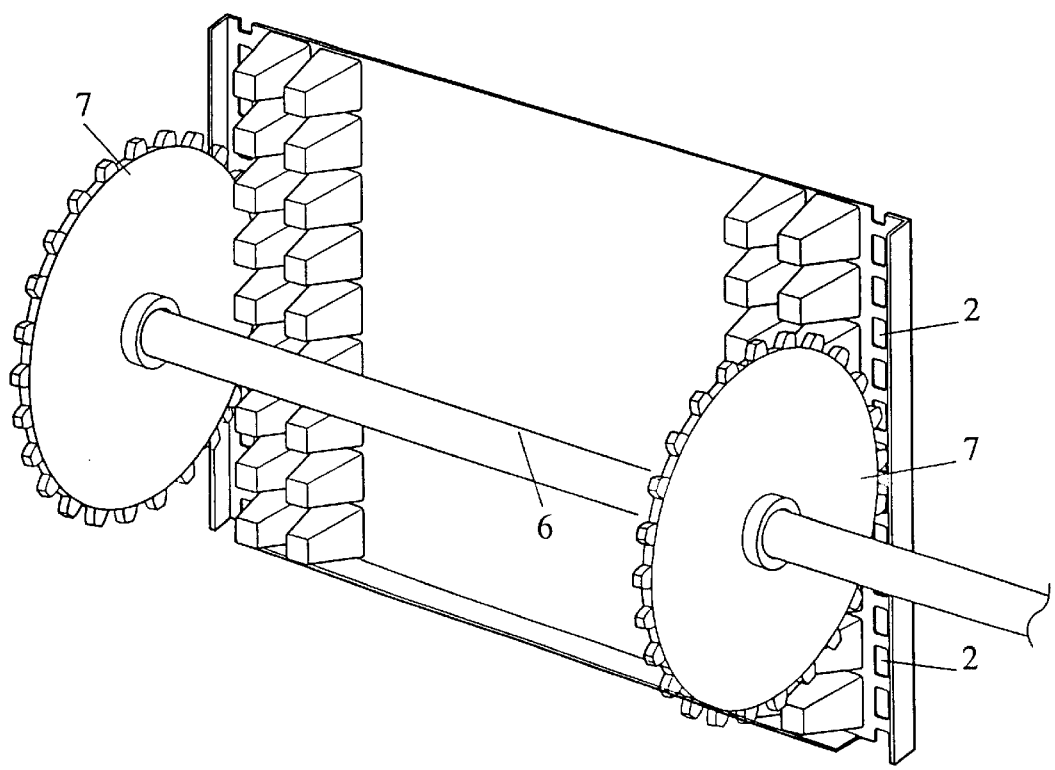
FIG. 6 shows a tray in accordance with FIGS. 1 or 5 operatively engaged with an indexing mechanism.
Figure 7:
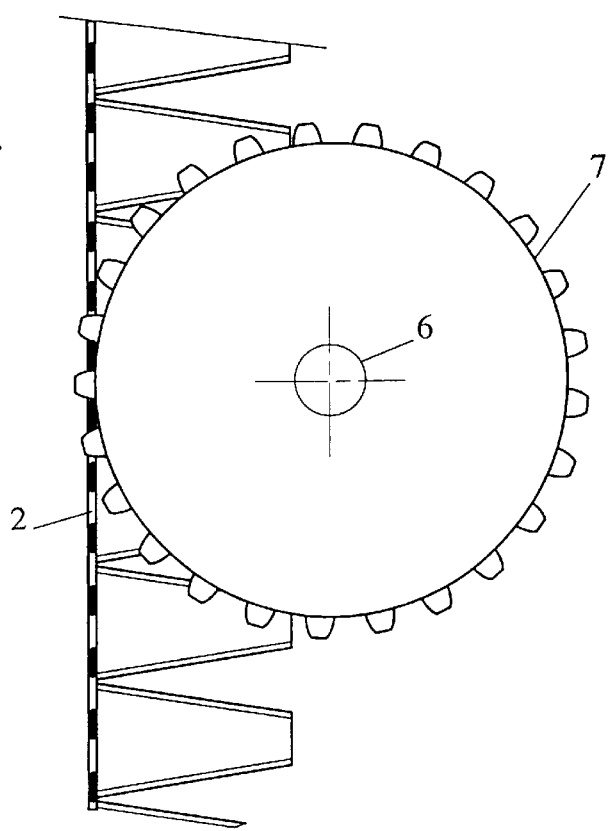
FIG. 7 shows a side/section view of the tray and indexing mechanism shown in FIG. 6.

FIGS. 6 and 7 illustrate a practical embodiment of an indexing mechanism capable of use in the present invention that is mechanically restrained by means of a common torque tube or shaft (6) with indexing gears (7) that engage through the notches (2) which form a rack in the sides of the tray.

Figure 8:
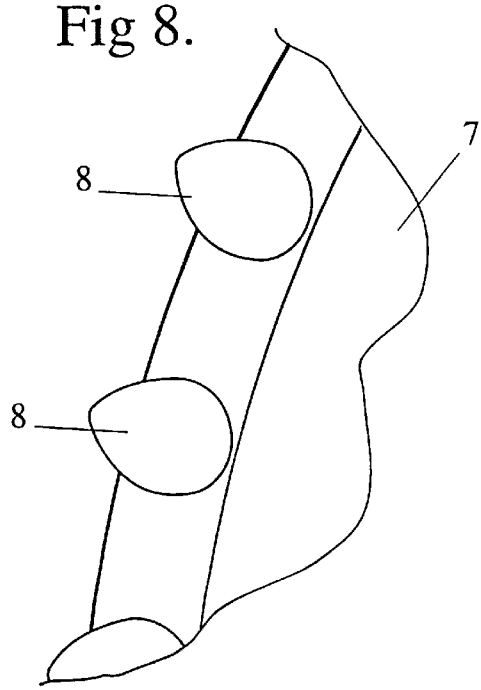
FIGS. 8 and 9 illustrate a possible modification to the indexing mechanism and tray indexing apertures shown in earlier drawings.
Figure 9:
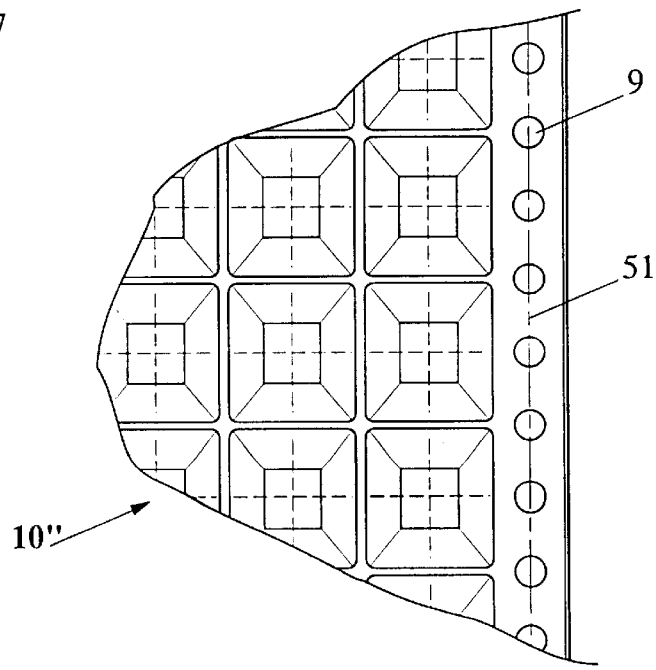

FIGS. 8 and 9 show another preferred embodiment utilising a different form of indexing gear and shape of notch to that which is described in detail with reference to FIGS. 1 to 7. FIGS. 8 and 9 show the restraining mechanisms being formed by a sprocket wheel or gear 7 having circular tapered engagement sprocket teeth (8), which engage in circular holes (9) in the engagement rack (51) formed at the ends of the tray (10"). The circular tapered teeth (8) provide, not only alignment entry and exit in the vertical plane but also in the horizontal plane. FIG. 9 is a partial section view, viewed from the underside of the tray (10").

Figure 10:
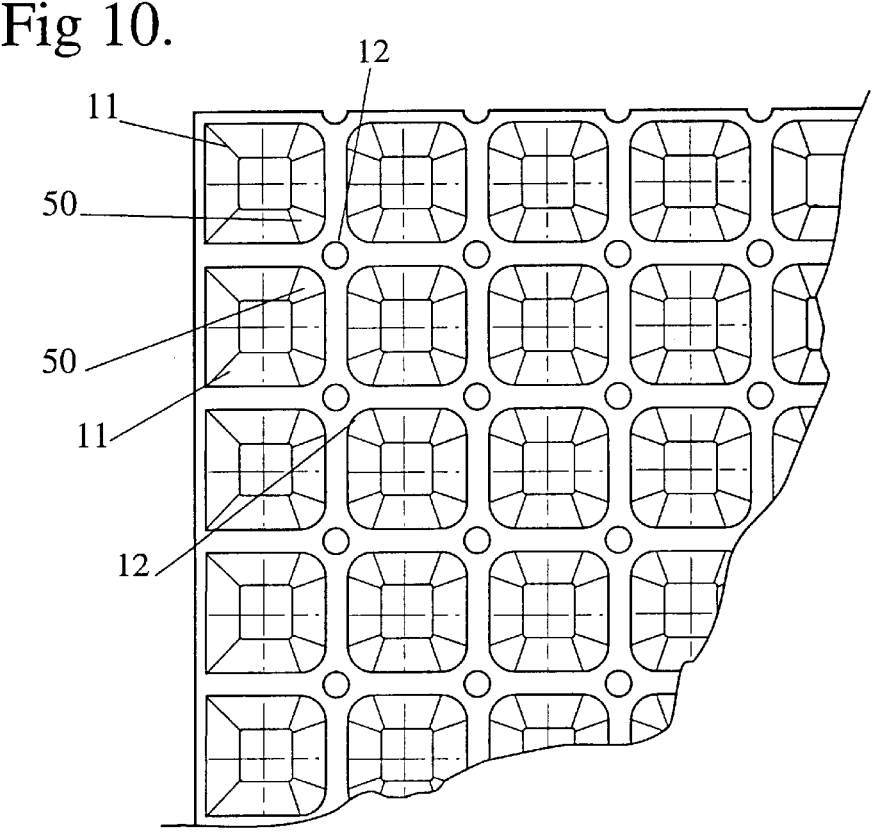
FIGS. 10 and 11 illustrate in upper plan view alternative embodiments for trays according to this invention.
Figure 11:
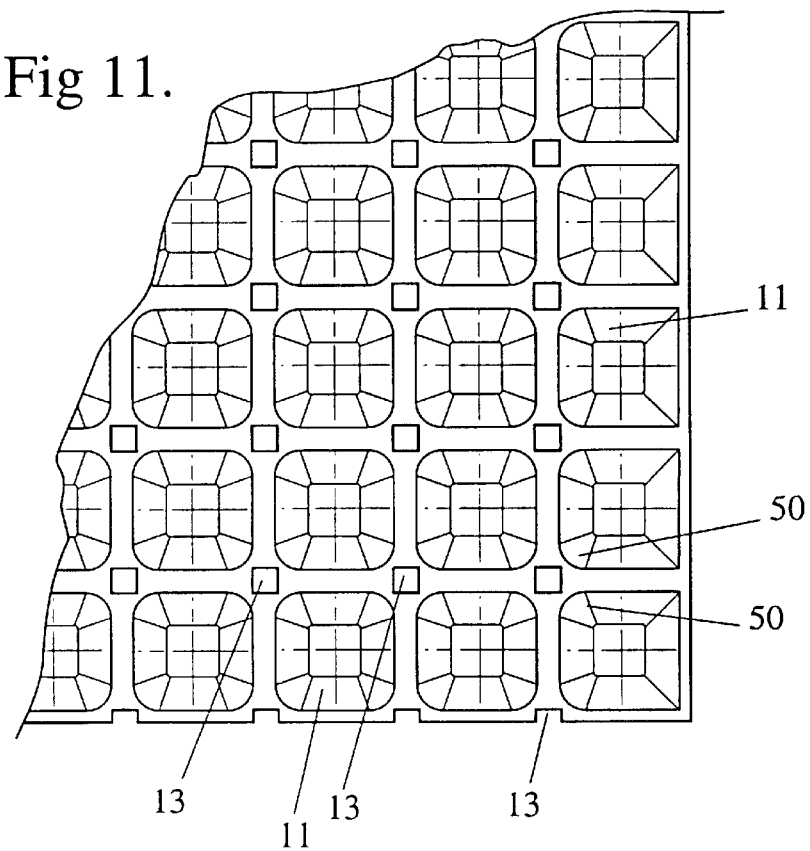
Figure 12:
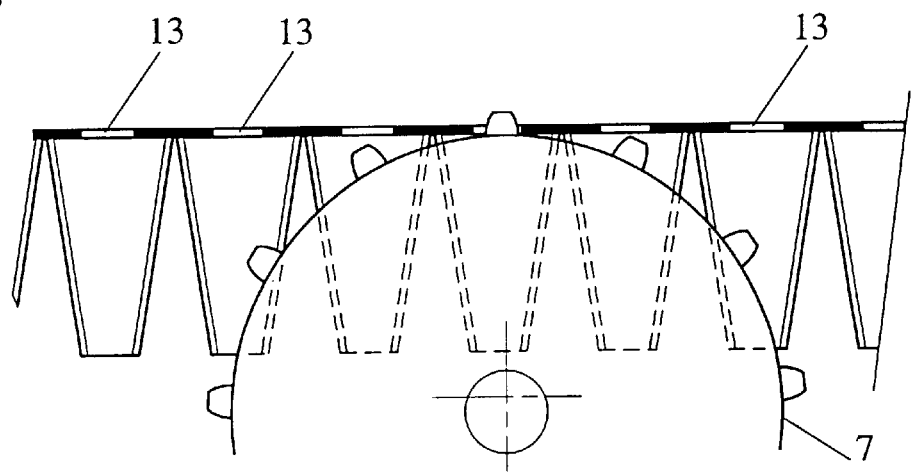
FIGS. 12 and 13 illustrate in partial section view, the trays of FIGS. 10 and 11 engaged with indexing mechanisms.
Figure 13:
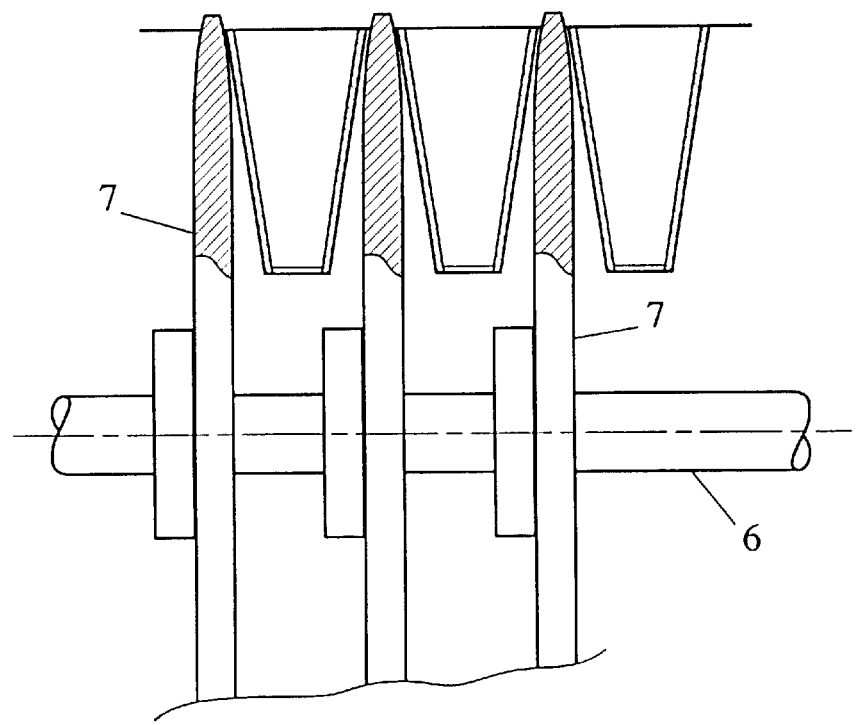

In another simple embodiment of the invention (FIG. 10), a vacuum formed tray includes cells (11) shaped with chamfered corners (50) that allow sufficient space in an upper flange zone between the corners of four adjacent cells to provide a sprocket engaging aperture (12). FIG. 10 shows a tray with circular sprocket engagement apertures (12) and FIG. 11 shows a tray with square or rectangular sprocket engaging apertures (13). FIGS. 12 and 13 show a section through trays of the type shown in FIGS. 10 and 11 essentially between the cells of adjacent cell rows, FIG. 13 being a section view at 900 to the section of FIG. 12. The arrangement utilises multiple sprocket or gear wheels 7 each engaging with a respective row of apertures (12) or (13).

Figure 14:
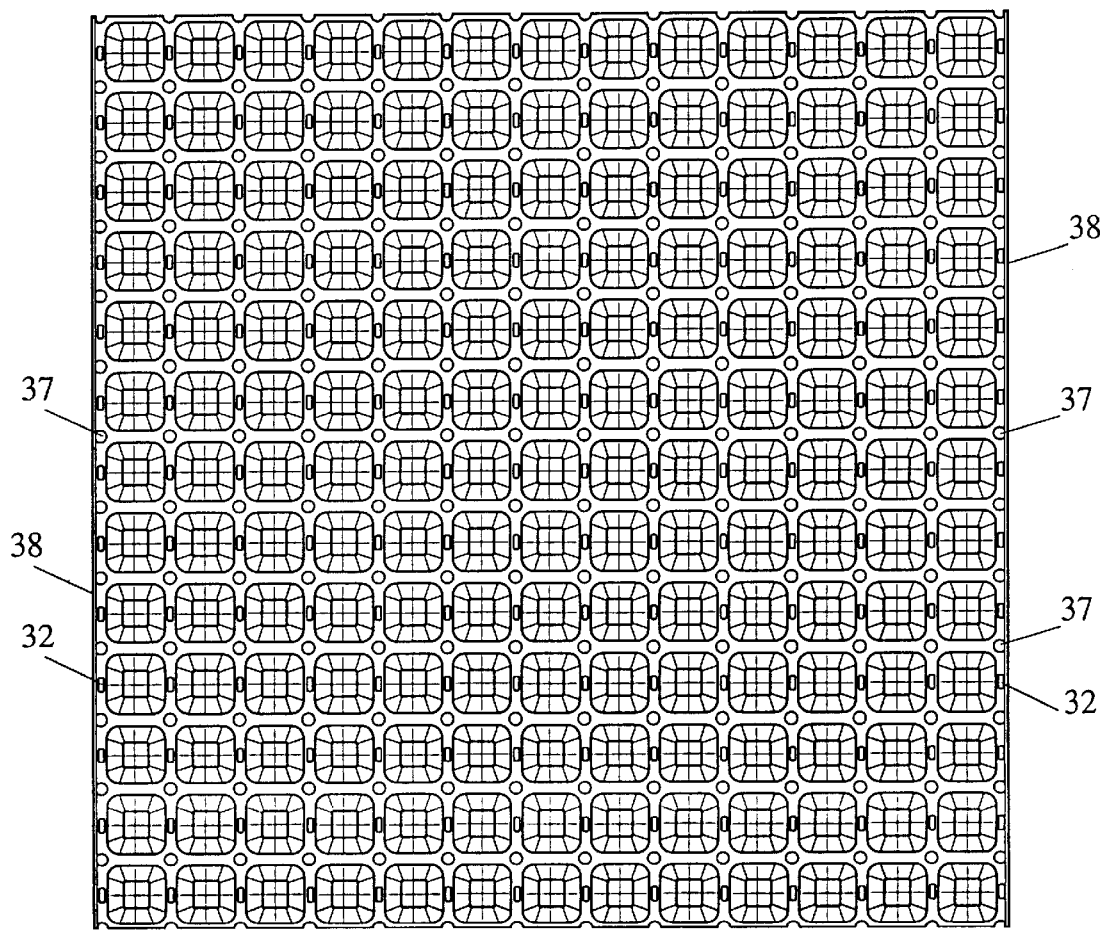
FIG. 14 illustrates in underneath plan view a still further preferred tray embodiment.

FIG. 14 shows another preferred embodiment (as viewed from the underside of the tray) of the tray with an extra row of round holes (37) down two external edges in the direction of indexing and also shows two flanges (38) folded down two external edges which gives the tray longitudinal stiffness. The number of holes may also be doubled by adding holes (32) in between the holes (37) located at the intersection of the flanges between adjacent cells. The shape of the holes may be circular as shown, or they may be square, rectangular or otherwise to cooperate with suitably shaped teeth of the sprocket or gear wheels.

Figure 15:
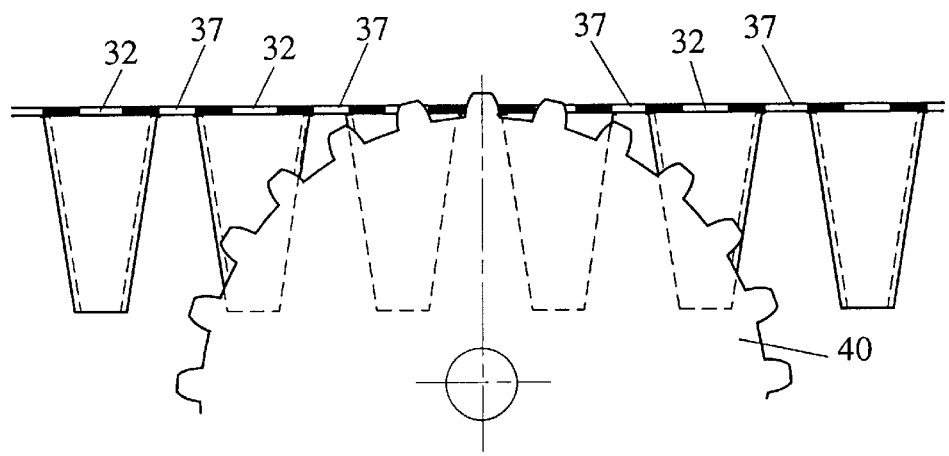
FIGS. 15 and 16 illustrate in partial section views, the tray of FIG. 14 engaged by an indexing mechanism.
Figure 16:
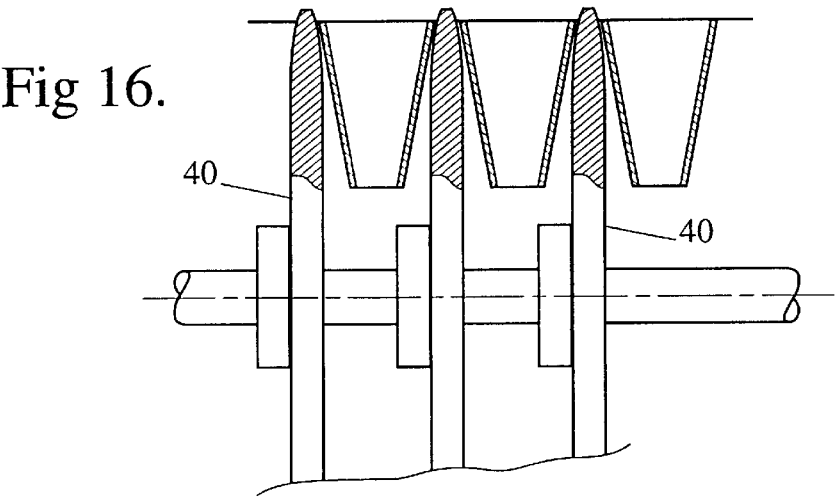

FIGS. 15 and 16 show a section through a portion of the tray of FIG. 14 showing the drive, sprocket/gear (40) engaging in square or rectangular holes (32, 37) of the tray described in FIG. 14.

Figure 17:
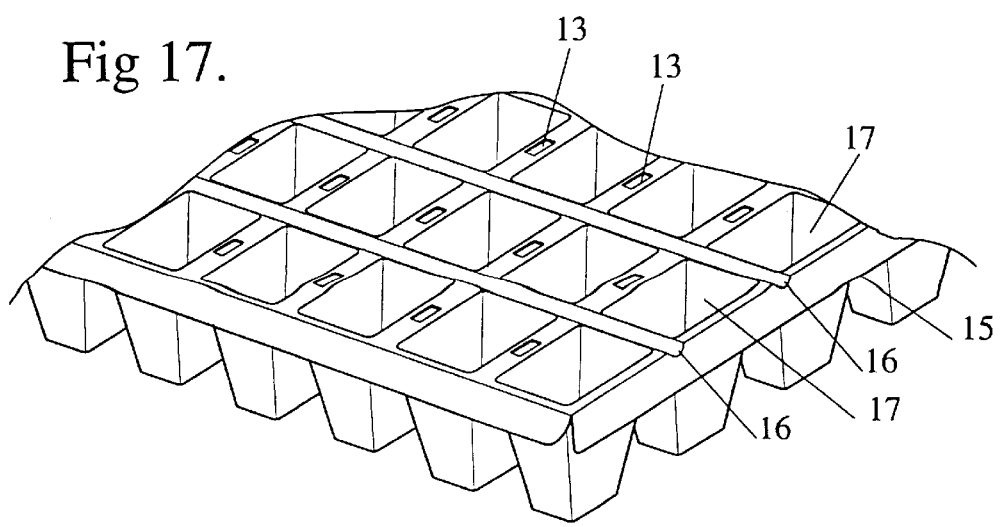
FIG. 17 shows in perspective view a corner region of yet another preferred tray embodiment.

FIG. 17 shows a corner region of a vacuum formed tray including stiffening edge flanges (15) with channels (16) being formed between adjacent rows of cells (17) from the outer stiffener flanges (15) from either side of the tray. These stiffener channels (16) can be placed between one or more of the cells. Within flange regions between adjacent cells (17), are sprocket gear notches (13) which are used with multi indexing sprockets (see FIGS. 20 and 21).

Figure 18:
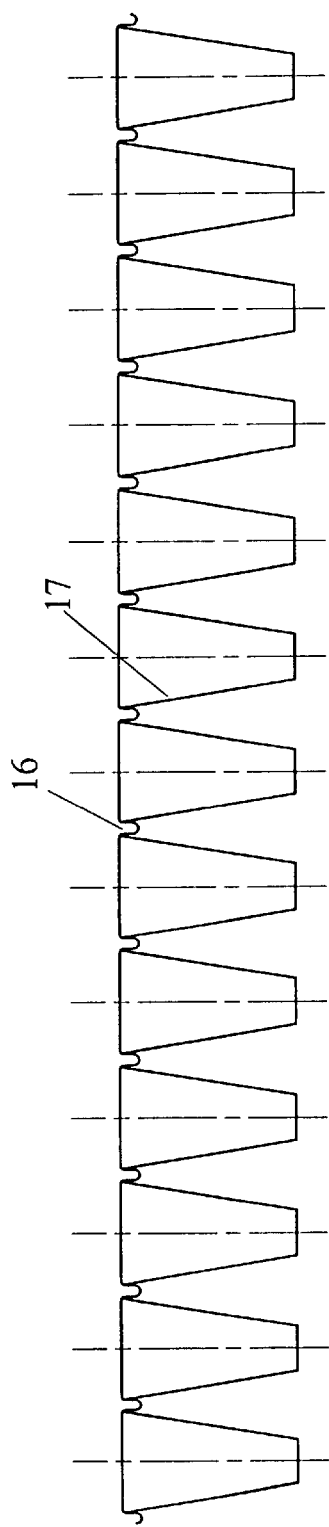
FIGS. 18 and 19 are respectively section and side edge views of the tray shown in FIG. 17.
Figure 19:
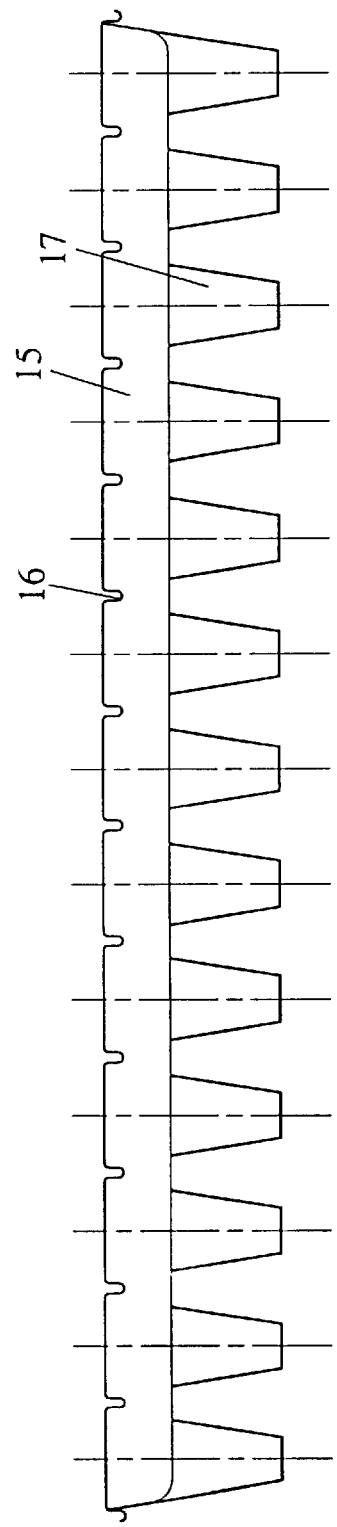

FIGS. 18 and 19 show respectively a section view and an edge view of the tray of FIG. 17 showing the channels (16), which serve a multi purpose and provide strength and stiffness to the tray. They also provide an engaging gear rack means as shown in FIG. 20, which can be used singularly and/or in combination with apertures for the gear engaging means shown.

FIG. 20 shows the stiffening channels (16) (as viewed from the side) engaging in the sprocket notch (18) while the sprocket teeth (19) enter and exit through the notches (13).

FIG. 21 is a section view (as viewed from the top) showing a multiple gear (7) engagement spreading uniform load restraint across the full width of the tray (20). It will be appreciated that the invention provides for the utilisation of either the multiplicity of sprockets engaging in the holes only, or engaging on the stiffening ribs only or a combination of the two.

Figure 22:
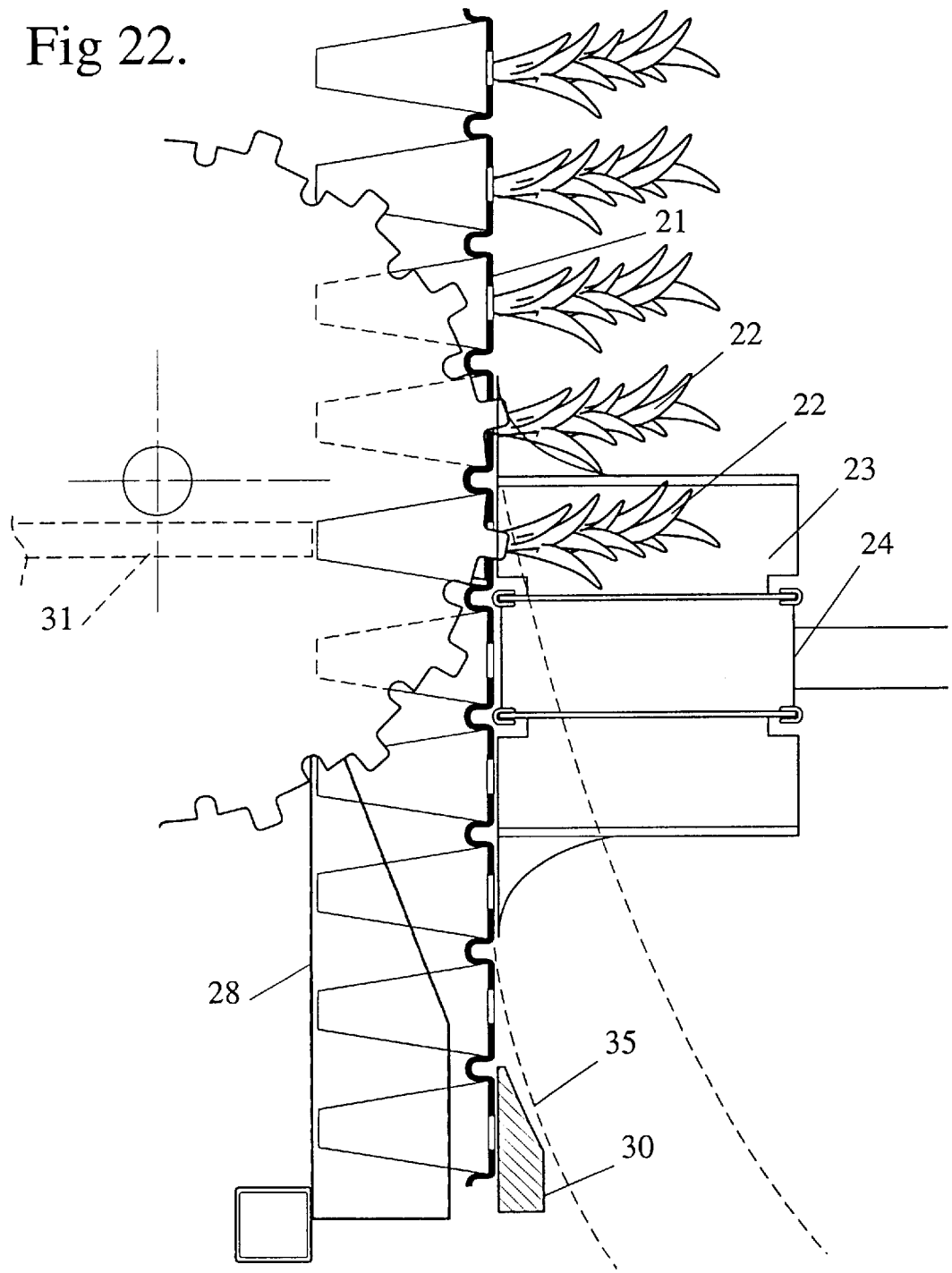
FIG. 22 shows in section view the tray of FIG. 17 cooperatively engaged with an indexing mechanism and equipment for ejecting plants from the tray and further handling same.
Figure 23:
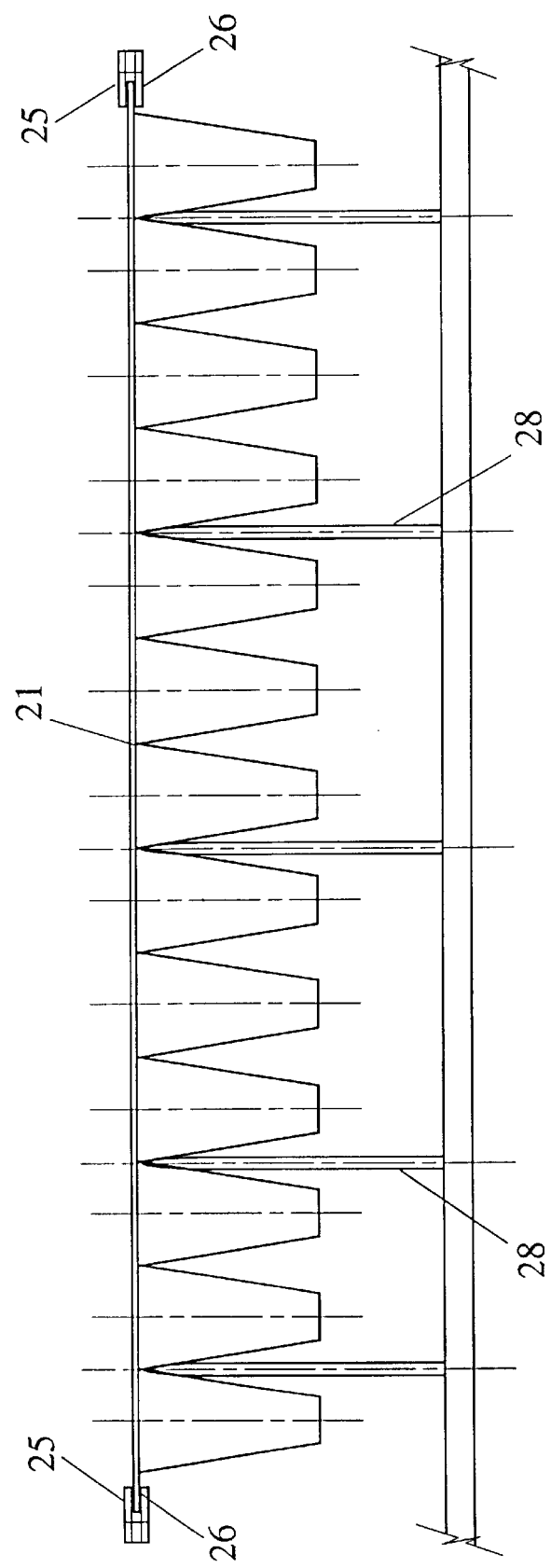
FIG. 23 shows in top plan view a preferred support structure capable of use when indexing trays as disclosed herein.

FIG. 22 shows the tray (21) in the engaged position for the ejection of the plug comprising a growing medium and plant (22) from the tray (21) into the plant receptacles (23) on a conveyor (24) intended to transfer the seedlings to a plant delivery and planting machine. The tray, in one preferred embodiment (FIG. 23) is restrained by external flanges (25) on the tray being held within a vertical slot (26) in which the tray slides in a downward direction when being indexed by the indexing sprocket wheels. The tray may also be restrained by thin vertical slides (28) which fit in between the cells (29) on the inside of the tray (21). A further external restraining bar (30) FIG. 22 may be located on the outside to stop the tray from moving outwardly or transversely of the vertical path of movement of the tray when plant ejection occurs. This restraining bar (30) is positioned to clear the conveyor when it swings away on arc (35) after loading a full row of plants. At the time of plant ejection the plant ejection bars (31) move inwardly and push the plug/plant (22) from the tray and into the waiting receptacles (23) on the conveyor (24). On ejection any forward movement of the tray caused by the eject bars is arrested by the plant receptacles (23) on the conveyor (24) which are in close proximity to the tray (21) when in the loading position as in FIG. 22.

Figure 24:
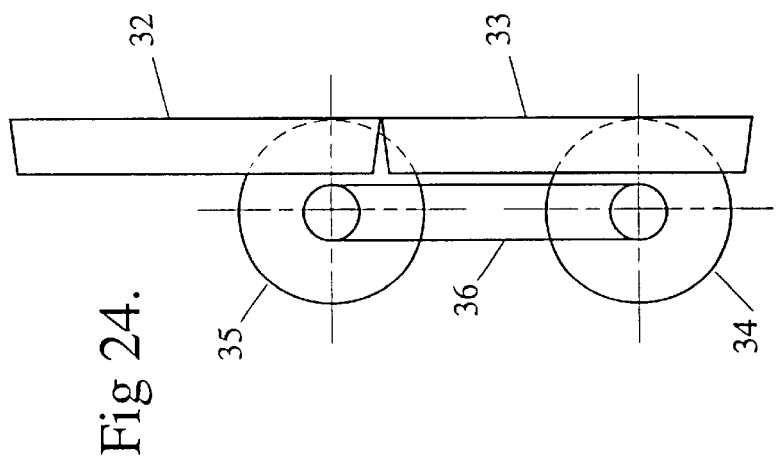
FIG. 24 illustrates in side view a possible further modification to indexing mechanisms as disclosed herein.

FIG. 24 shows a side elevation of two trays (32) and (33) in the vertical position being indexed downwardly by means of sprocket/gear (34). This sprocket gear is positioned at the plant eject location as discussed with reference to FIG. 22, and is mechanically connected to a second sprocket/gear (35) via chain (36) or other means. This second sprocket/gear (35) is positioned so that both trays are engaged in an indexing means at all times. This ensures the accurate precise indexing of trays.

Figure 25:
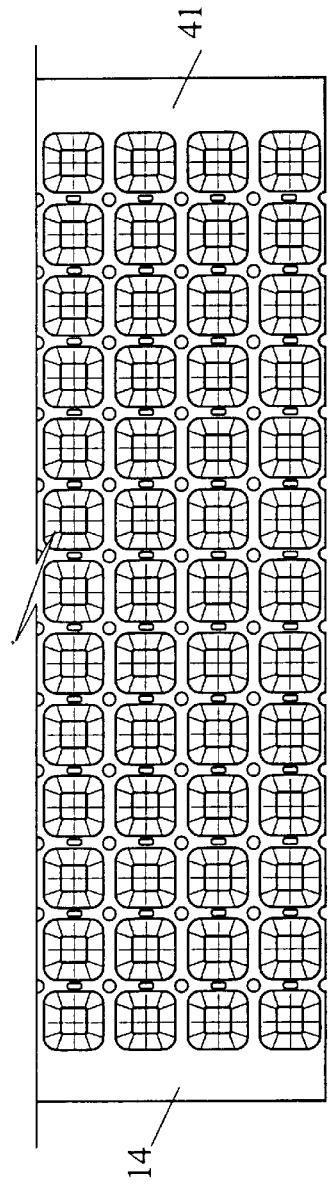
FIGS. 25 and 26 illustrate in plan view and in side view with a cooperating indexing mechanism, a still further preferred tray embodiment.
Figure 26:
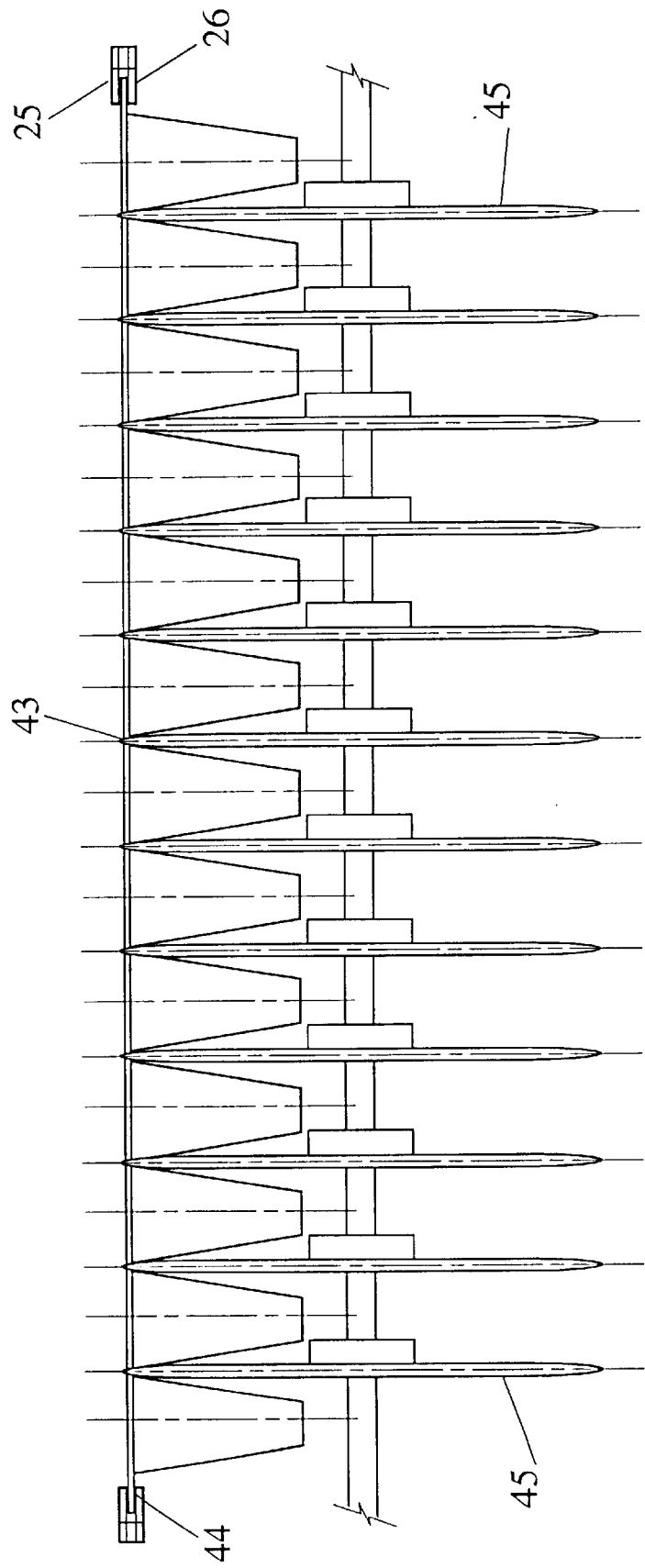

FIGS. 25 and 26 show a tray in the same configuration as that shown in FIG. 14 the only difference being that the fold down flange (38) shown in FIG. 14 is now a flat flange (41) being an extension of the top surface of the tray (42). FIG. 25 is a plan elevation of the tray showing horizontal flanges (41). During the downloading, indexing and plant eject sequences of the trays, the trays (43) (FIG. 26), are contained in slots (44) which act as guides while the indexing sprockets/gears (45) engage with the tray and move it downward (see FIG. 22).

In all of the embodiments the open ends of the cells are co-planar with one another and with the thicker sections in which the indexing openings are formed.

What I claim is:

1. A nursery tray formed from a sheet of polymer material having defined zones of thicker and thinner polymer material, said nursery tray having at least two rows of aligned indexing apertures formed in thicker zones of the sheet, the thickness of the material containing said indexing apertures being greater than that of said thinner zones of said sheet prior to the forming of said tray, and a plurality of rows of vacuum formed cells located between said rows of indexing apertures, said cells being adapted to be filled with growing medium for plant propagation.

2. A nursery tray according to claim 1 wherein a plurality of said vacuum formed cells are located outwardly of the rows of indexing apertures.

3. A nursery tray according to claim 1 wherein said sheet has stiffening ribs between at least some of said cells, said stiffening ribs extending laterally relative to the rows of indexing apertures.

4. A nursery tray according to claim 3 wherein said sheet has bridging material between said cells, said stiffening ribs comprising upwardly open grooves located in the bridging material without communicating with said cells.

5. A nursery tray according to claim 4 wherein the grooves extend laterally relative to the rows of indexing apertures.

6. A nursery tray according to claim 4 wherein the grooves extend to opposite edges of said sheet.

7. A nursery tray according to claim 1 wherein said sheet has peripheral flanges at opposite edges, a first row of said indexing apertures being formed in a first one of said flanges and a second row of said indexing apertures being formed in another of said flanges, each of said flanges having a depending stiffening flange.

8. A nursery tray according to claim 7 including stiffening portions depending perpendicularly from the stiffening flanges, said stiffening portions being located at a peripheral edge of the outermost cells.

9. A nursery tray according to claim 1 wherein a first row of indexing apertures is provided in bridging material between adjacent cells, and a second row of indexing apertures is provided spaced from said first row and also located in bridging material between other adjacent cells.

10. A nursery tray according to claim 9 including multiple additional rows of indexing apertures in bridging material between adjacent cells, the number of said additional rows of indexing apertures being any number more than two up to and including the number of spaces between adjacent rows of said cells.

11. A nursery tray according to claim 9 further including an upwardly open groove in bridging material between two adjacent rows of said cells, said groove extending laterally relative to said rows of indexing apertures.

12. An indexable nursery tray formed from a sheet of polymer material having at least two aligned rows of indexing apertures formed in said sheet and a plurality of rows of vacuum formed cells located between said rows of indexing apertures and adapted to be filled with growing medium for plant propagation, the cells of said rows of cells having open tops and being co-planar with one another and with adjacent bridging material forming parts of said sheet, a first row of said indexing apertures being provided in the bridging material adjacent one row of said cells, and a second row of said indexing apertures being provided in the bridging material adjacent another row of said cells, said sheet having zones of thicker material in which said indexing apertures are formed, the thickness of the material containing said indexing apertures being thicker than the minimum thickness of said sheet prior to forming said tray.

13. A nursery tray according to claim 12 wherein the material containing said indexing apertures has a thickness no less than that of the minimum thickness of said sheet of material prior to forming said tray.

14. A nursery tray according to claim 12 wherein a plurality of rows of said cells are located outwardly of the rows of indexing apertures.

15. A nursery tray according to claim 12 wherein the rows of indexing apertures are formed in said thicker zones prior to the vacuum forming of said cells.

16. A nursery tray according to claim 12 wherein said sheet is extruded in such form as to provide at least some of said thicker zones during extrusion.

17. A nursery tray according to claim 12 including stiffening ribs between at least some adjacent rows of said cells, said stiffening ribs extending laterally relative to the rows of indexing apertures.

18. A nursery tray according to claim 12 including an upwardly open groove located in bridging material between one or more adjacent rows of said cells without communicating with said cells.

19. A nursery tray according to claim 18 wherein said groove extends laterally relative to the rows of indexing apertures.

20. A nursery tray according to claim 18 wherein said groove extends to opposite edges of the sheet.

21. A nursery tray according to claim 12 wherein a first row of indexing apertures is provided in a first laterally extending flange portion on one peripheral side of a row of cells and a second row of indexing apertures is provided in a second laterally extending flange portion on the opposite peripheral side of another row of cells, the nursery tray further having a depending stiffening flange portion extending from an outer edge of each of said first and second laterally extending flange portions.

22. A nursery tray according to claim 21 including external further stiffening flange portions extending perpendicularly to the depending stiffening flange portions located outwardly of the indexing apertures, the further stiffening flange portions being located at a peripheral edge of the outermost cells.

23. A nursery tray according to claim 12 including multiple additional rows of indexing apertures in bridging material between adjacent cells, the number of said additional rows of indexing apertures being any number more than two up to and including the number of spaces between adjacent rows of said cells.

24. A nursery tray according to claim 12 including an upwardly open trough formed in material bridging adjacent rows of said cells, said trough extending substantially across said nursery tray laterally relative to said rows of indexing apertures.

25. A nursery tray formed from a sheet of plastic material having zones of different thicknesses, said tray having at least two spaced apart rows of indexing apertures formed in zones of the sheet having a first thickness, and a plurality of vacuum formed cells located between said rows of indexing apertures adapted to be filled with growing medium for plant propagation, the material between said rows having a thickness less than that of said first thickness of material, said first thickness being no less than that which is the minimum thickness of the sheet of material prior to being formed into said tray, and the thickness of the sheet material containing said indexing apertures being thicker than the minimum thickness of the sheet material prior to forming said sheet into said tray.

26. A nursery tray according to claim 25 wherein a plurality of said cells are located outwardly of the rows of indexing apertures.

27. A nursery tray according to claim 25 wherein the sheet material is preformed with zones of thicker and thinner material, said indexing apertures being formed in a zone of thicker material.

28. A nursery tray according to claim 27 wherein the sheet of material is formed via an extrusion process.

29. A nursery tray according to claim 25 including stiffening ribs of relatively thicker material between at least some adjacent rows of said cells, said stiffening ribs being disposed generally laterally relative to the rows of indexing apertures.

30. A nursery tray according to claim 25 including at least one upwardly open groove located in the sheet material bridging one or more adjacent rows of said cells.

31. A nursery tray according to claim 30 wherein each said groove extends laterally relative to the rows of indexing apertures.

32. A nursery tray according to claim 30 wherein each said groove extends to opposite edges of the sheet.

33. A nursery tray according to claim 30 wherein none of said grooves communicates with any of said cells.

34. A nursery tray according to claim 25 wherein a first row of said indexing apertures is provided on a first laterally extending flange on one peripheral side of the cells and a second row of said indexing apertures is provided on a second laterally extending flange on another peripheral side of the cells, each said flange having a stiffening portion extending from an outer edge thereof.

35. A nursery tray according to claim 34 wherein said tray includes additional flange stiffening portions extending perpendicularly to the stiffening portions located outwardly of the indexing apertures, the additional stiffening flange portions being located at a peripheral edge of the outermost rows of cells.

36. A nursery tray according to claim 25 wherein a first row of said indexing apertures is provided in bridging material between adjacent cells of one of said row of said cells, and a second row of said indexing apertures is provided in bridging material between adjacent cells of another row of said cells.

37. A nursery tray according to claim 36 wherein multiple rows of said indexing apertures are provided in bridging material between adjacent rows of said cells, the number of said rows of indexing apertures being any number more than two up to and including the number of spaces between all adjacent rows of said cells.

38. A nursery tray according to claims 37 further including at least one upwardly. open trough formed in bridging material between at least two adjacent rows of said cells, each said trough extending substantially across said nursery tray and laterally relative to said rows of said indexing apertures.

39. A method of forming from a sheet of plastic material a nursery tray having an array of propagating, cells and at least two parallel rows of indexing apertures in spaced defined zones of different thicknesses, said method comprising the steps of:

(i) providing a sheet of plastic material having said defined zones;

(ii) forming said rows of indexing apertures in the thicker of said defined zones of said sheet; and (iii) heating at least the remainder of said sheet and forming said propagating cells therein while maintaining the thickness of said thicker defined zones substantially constant.

40. The method according to claim 39 wherein said defined zones are provided in said sheet in a predefined pattern prior to the forming of said rows of indexing apertures.

41. The method according to claim 40 including forming stiffening ribs in said predefined pattern.

42. Indexing and plant eject apparatus for use with nursery trays of the kind having a plurality of cells arranged in predefined adjacent rows and at least two spaced aligned rows of indexing apertures arranged generally perpendicularly to said rows of cells, said apparatus including guide means for guiding said trays along a substantially vertical path downwardly past an eject mechanism, said guide means including edge restraining means to restrain lateral edge regions of the trays during said downward movement, and a carrier mechanism movable between a first position to receive plants ejected from each said nursery tray and at least one second position to discharge plants from the carrier mechanism, said carrier mechanism in said first position being operable to restrain movement of each said tray transversely of said path during transfer by said eject mechanism of plants from each said tray to said carrier mechanisms.

* * * * *